Oct. 24, 1939.  B. J. SWEO  2,177,046
CERAMIC WARE WALL STRUCTURE
Filed March 5, 1937
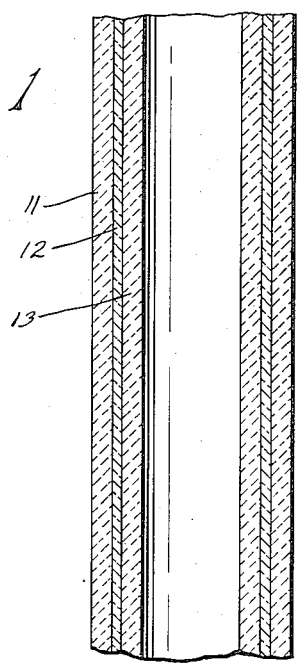
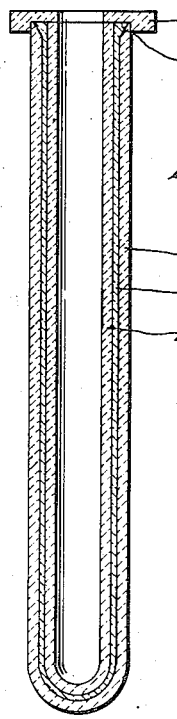
Inventor
Benjamin J. Sweo
By E. N. Lovewell
Attorney Patented Oct. 24, 1939

2,177,046

UNITED STATES PATENT OFFICE 2,177,046

CERAMIC WARE WALL STRUCTURE

Benjamin J. Sweo, Cleveland, Ohio

Application March 5, 1937, Serial No. 129,291

3 Claims. (Cl. 136—4)

My invention relates to improvements in ware made of ceramic materials, and particularly to the wall structure of porcelain tubular ware, pyrometer protection tubing and the like.

The primary object of my invention is to provide a light weight composite wall of ceramic material, such as porcelain, which will be substantially impervious to gases, rigid and strong at high temperatures, resistant to thermal shock produced by sudden changes in temperature, and which will present a surface that is comparatively free from any tendency to adhere to objects with which it might come in contact at high temperatures.

Referring, for example, to porcelain pyrometer protection tubing for thermal elements used in high temperature measurement, it may be stated that the art recognizes in a general way the following types: namely, glazed semi-vitreous porcelain ware, semi-vitreous porcelain ware and vitreous porcelain ware. Each of these types lacks certain desirable attributes.

For example, glazed semi-vitreous ware, when subjected to temperatures above the softening point of the glaze, has a tendency to adhere to objects with which it may come in contact. Semi-vitreous ware is porous and permits the passage of gases therethrough. In certain installations, where corrosive gases or reducing gases are present, the passage of gases through the wall of a pyrometer protection tube might cause impairment of the thermo-elements contained therein. Vitreous porcelain is brittle and, when of such composition that it is vitrifiable at commercially obtainable temperatures, it will lose strength and rigidity when subjected to temperatures approaching the temperature at which the vitreous material was produced. Also, vitreous porcelain has a relatively high coefficient of expansion, which renders ware of this material subject to damage from thermal shock.

Each of the above mentioned classes of ceramic material individually possesses certain desirable attributes, but no single group possesses all of the desired properties. In other words, glazed semi-vitreous ware is substantially impervious to gases, is of light weight and is quite resistant to thermal shock. Semi-vitreous ware possesses these same attributes with the exception that it is not impervious to gases. Vitreous ware is impervious to gases but is easily damaged, as for example, by thermal shocks.

In my invention, I incorporate all of the desirable properties of the three classes by proper combination and arrangement of vitreous and semi-vitreous materials and thereby circumvent their individual limitations.

In carrying out my invention, I provide a plurality of mutually bonded walls to compose a unitary wall structure. The outer walls, or in the case of tubular structures the outermost and the innermost concentric walls, are of semi-vitreous material. The middle or intermediate walls are of vitreous material or alternately of vitreous and semi-vitreous material. The outer walls of semi-vitreous material provide strength and rigidity at high temperatures and protect the intermediate walls of vitreous material from contact with hot bodies. The semi-vitreous walls also protect the middle or intermediate vitreous walls from thermal shock. If ware of such construction is moved quickly from an atmosphere of one temperature to an atmosphere of a different temperature, or if a material at a temperature greatly different from that of the ware is placed in the ware, the walls of semi-vitreous material which are resistant to thermal shock and possess relatively low thermal conductivity impede the flow or transfer of heat to or from the less heat resistant walls of vitreous material. The purpose of the vitreous middle or intermediate wall is to make the composite structure substantially gas tight; that is, impervious to gases.

It is possible to secure the desirable advantages with such a composite wall structure, in protection tubing for example, with a total wall thickness equivalent to the wall thickness of a conventional glazed semi-vitreous protection tube.

A reservoir containing additional vitreous porcelain may be provided to replace portions of the intermediate vitreous wall which might be absorbed by the semi-vitreous walls, volatilized, or otherwise lost.

Ware constructed according to my invention is illustrated in the accompanying drawing, in which—

Figure 1 is a longitudinal sectional view of a porcelain tube constructed according to the invention.

Figure 2 is a similar view illustrating the invention as applied to a porcelain pyrometer protection tube.

The shapes as herein shown are merely for the purpose of illustration. It is to be understood that the invention may be embodied in any shape requiring a ceramic wall as a part or all of its structure.

Referring more particularly to Figure 1, I have illustrated a porcelain tube composed of an outer wall 11 of semi-vitreous porcelain, a middle or intermediate wall 12 of vitreous porcelain, and an inner wall 13 of semi-vitreous porcelain, all being concentric with respect to each other. It is to be understood that any relative thicknesses and a larger number of walls may be used without departing from the scope of the invention, provided that the outermost and innermost walls are composed of semi-vitreous porcelain or similar material and that one or more of the intermediate walls is composed of vitreous porcelain or similar material.

Figure 2 illustrates a pyrometer protection tube with an outer wall 11 of semi-vitreous porcelain, a middle or intermediate wall 12 of vitreous porcelain, and an inner wall 13 of semi-vitreous porcelain. A reservoir 14 containing additional vitreous porcelain is provided at the top of the tube and a collar 15 is shown, which may be attached to the top of the pyrometer protection tube and fired thereon if desired.

In order to disclose my invention more clearly, I will give an example of the materials used and the method followed in manufacturing a porcelain pyrometer protection tube. The semi-vitreous porcelain composition may consist of the following ingredients and proportions:

|  | Per cent |
|---|---|
| Sillimanite grog | 50 |
| Kaolin | 35 |
| Ball clay | 15 |

This mixture is ground with water in a ball mill until a slip of a creamy consistency results. This composition, when dried and fired to a temperature in the neighborhood of 1450° C., forms an anhydrous semi-vitreous body.

The vitreous porcelain composition may be compounded according to the following formula:

|  | Per cent |
|---|---|
| Calcium carbonate | 25 |
| Feldspar | 35 |
| Kaolin | 9 |
| Silica | 31 |

This mixture is likewise ground with water to the proper consistency. When dried and heated to a temperature in the neighborhood of 1450° C., this material forms an anhydrous vitreous body.

In manufacturing my invention, referring particularly to Figure 1, the outer wall may be made by casting the slip in a suitable mold. The intermediate wall 12 may be applied by filling the tube 11 with a vitreous porcelain composition slip and then allowing the excess material to drain out when the desired wall thickness is obtained. The inner wall 13 may be made by filling the composite tube 11, 12 with a semi-vitreous composition slip and draining it in the same manner. The body so constructed is then dried and heated to a temperature in the neighborhood of 1450° C., the walls 11 and 13 maturing to a semi-vitreous state and the wall 12 maturing to a vitreous state.

Referring particularly to Figure 2, it may be found desirable in certain cases to provide a reservoir 14 containing vitreous porcelain at the top of the tube to compensate for shrinkage in volume of the vitreous wall 12 by allowing the vitreous mass, when molten, to run between the semi-vitreous walls 11 and 13, thereby maintaining a continuous vitreous wall.

It will be understood that in describing the invention, the composition, the temperature and the process of making the ware are merely illustrative. The composition and materials may be altered at will to bring out desirable properties, provided that the composition for the outer walls will mature to a semi-vitreous body at approximately the same temperature at which the composition for the inner wall will mature to a vitreous body, and provided that the resulting expansion and contraction coefficients of the semi-vitreous and vitreous bodies are not so different that excessive strains will exist in the resulting composite wall.

Having thus described the invention, what I claim as new and desire to secure by Letters Patent, is:

1. As an article of manufacture, a unitary pyrometer tube comprising concentric tubular layers of semi-vitreous porcelain resistant to high temperatures, and an intermediate layer therebetween composed of vitreous porcelain which is impervious to gases so that it constitutes a seal for the pores in the semi-vitreous porcelain, all of said layers being intimately bonded together by firing them as a unit.

2. As an article of manufacture, a unitary pyrometer tube comprising concentric tubular layers of semi-vitreous porcelain resistant to high temperatures, and an intermediate layer therebetween composed of vitreous porcelain which is impervious to gases, so that it constitutes a seal for the pores in the semi-vitreous porcelain, all of said layers being intimately bonded together by firing them as a unit, said vitreous layer being completely enveloped by the semi-vitreous layers.

3. As an article of manufacture, a unitary pyrometer tube comprising concentric tubular layers of semi-vitreous porcelain resistant to high temperatures, an intermediate layer therebetween composed of vitreous porcelain which is impervious to gases, so that it constitutes a seal for the pores in the semi-vitreous porcelain, all of said layers being intimately bonded together by firing them as a unit, said vitreous layer being completely enveloped by the semi-vitreous layers, and a well within the outer layer and in communication with the intermediate layer, said well containing a surplus of vitreous porcelain to replenish losses that may be incurred by the intermediate layer during manufacture or use.

BENJAMIN J. SWEO.